United States Patent
Laaksonen

(10) Patent No.: US 7,035,469 B2
(45) Date of Patent: Apr. 25, 2006

(54) IMAGE PROCESSING

(75) Inventor: Mika H. Laaksonen, Oulu (FI)

(73) Assignee: Nokia Corporation, Espoo (FI)

( * ) Notice: Subject to any disclaimer, the term of this patent is extended or adjusted under 35 U.S.C. 154(b) by 585 days.

(21) Appl. No.: 10/035,649

(22) Filed: Dec. 28, 2001

(65) Prior Publication Data

US 2002/0101992 A1 Aug. 1, 2002

(30) Foreign Application Priority Data

Dec. 29, 2000 (GB) .................................. 0031825

(51) Int. Cl.
*G06K 9/36* (2006.01)
(52) U.S. Cl. ...................... 382/232; 382/233
(58) Field of Classification Search ................ 382/232, 382/233; 345/555, 582, 536, 552, 422, 557, 345/629; 351/239, 237
See application file for complete search history.

(56) References Cited

U.S. PATENT DOCUMENTS

| | | | | |
|---|---|---|---|---|
| 4,982,292 A | * | 1/1991 | Itoh et al. | 382/233 |
| 5,408,328 A | | 4/1995 | Boliek et al. | 358/261.4 |
| 5,805,735 A | * | 9/1998 | Chen et al. | 382/239 |
| 5,880,814 A | * | 3/1999 | McKnight et al. | 351/239 |
| 6,366,289 B1 | * | 4/2002 | Johns | 345/543 |
| 6,407,741 B1 | * | 6/2002 | Morein et al. | 345/555 |
| 6,452,602 B1 | * | 9/2002 | Morein | 345/555 |
| 6,545,687 B1 | * | 4/2003 | Scott et al. | 345/629 |

FOREIGN PATENT DOCUMENTS

| | | |
|---|---|---|
| EP | 0824246 A | 2/1998 |
| EP | 0 942 588 A2 | 9/1999 |
| EP | 1050846 A | 11/2000 |
| GB | 2 305 800 A | 4/1997 |
| WO | WO 96/01032 | 1/1996 |
| WO | WO 96/39681 | 12/1996 |

OTHER PUBLICATIONS

Oh et al., "Adaptive Adjustment of the Search Window for Block-Matching Algorithm with Variable Block Size", IEEE vol. 44, No. 3, Aug. 1998, pps. 659-666.*

* cited by examiner

*Primary Examiner*—Anh Hong Do
(74) *Attorney, Agent, or Firm*—G. Peter Albert, Jr.; Foley & Lardner, LLP

(57) ABSTRACT

A device, and associated method for image processing. An image area is divided into a plurality of image data blocks. Each of the image data blocks is compressed and stored in a data storage. Before an image is displayed based on the stored data, at least one of the image data blocks is selectively fetched from the data storage. After fetching the image data block, the image data block is decompressed. The image is displayed based on image data included in the fetched image data blocks. Modification to the boundaries of the image area is made by means of the selective fetching without modifying the image data stored in the data storage.

28 Claims, 2 Drawing Sheets

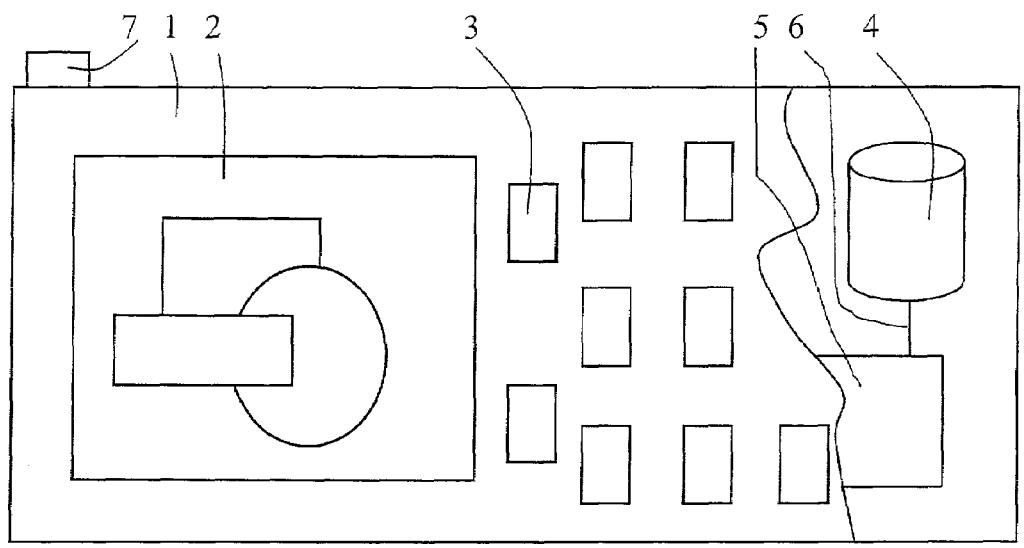
Fig. 1
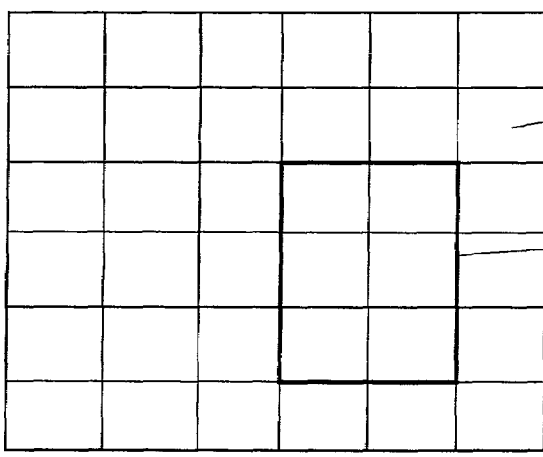 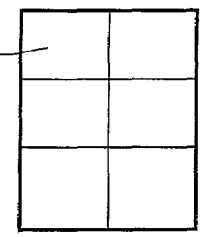
Fig. 2a    Fig. 2b
```
      30 31 32
       ↙ ↙  ↘
   abcde
   fghij ⌒  ghi
   klmno  →  lmn
   pqrst
```
Fig. 3

IMAGE PROCESSING

FIELD OF THE INVENTION

The present invention relates to image processing and in particular, but not exclusively, to displaying images based on image data stored in image data storage means.

BACKGROUND OF THE INVENTION

An image can be represented by means of an appropriate image representation device. For example, an image can be displayed by a display device comprising a display screen or other means for presenting an image based on image data. The image data can be created, for example, by means of a digital camera. When a photograph is taken by the digital camera, the digital camera creates an image data file that may be stored in a memory means of the camera. The image data may also or alternatively be stored in a removable data carrier, such as in a tape, CD (compact disc) or a memory card. Digital cameras are well known in the art, and will thus not be explained in more detail herein.

Typically the image or audio data is stored in a file, record or similar data unit. It is possible to compress the data stored in the data unit. The compressed data requires less storage capacity when stored in an appropriate data storage means. A reason for the compression is that the digital cameras or other portable devices are typically provided only with a limited storage capacity. Furthermore, if the data unit is to be transported between two or more devices, compressed data files require less transportation capacity from the communication media between the devices.

An example of compressed data units is a compressed JPEG file for storing image data. The term 'JPEG' stands for Joint Photographic Experts Group which is formed by experts nominated by standards bodies and major companies. A standard by the JPEG is IS 10918-1 (ITU-T T.81), which is the first of a multi-part set of standards for still image compression. JPEG is based on the features of this standard, in association with a JFIF file format by C-Cube Microsystems.

Digital cameras typically compress images with a so called lossy compress algorithm before storing these to a memory. The above referenced JPEG supports the lossy compression. By means of the lossy compression the size of the image files can be made small enough so that it is possible to store the image data in limited storage capacity of the camera. A disadvantage of the lossy compression technique is that it loses information during the compressing operations.

One important feature of the digital photography is that it is possible to adjust and edit the images afterwards. The changes can be made by anybody. That is, the creator (i.e. the photographer) or the viewer or any other person in a chain between the creator and the viewer may edit or otherwise alter the image.

A possible editing task is the so called image cropping. In the image cropping unnecessary or otherwise unwanted areas of the image are cut out from the boundary areas of the image. In that way image size resolution, and thus size of the image file can be reduced.

An unwanted side effect of the editing processes is that the quality of the image may be reduced. For example, if an image is cropped and stored successive times the quality of image may be reduced in each editing cycle comprising decompression-compression and storing. This is caused by the possibility of loosing information during the image compression stages, especially if a lossy compression algorithm is used.

Thus the quality of the image may be reduced every time the image is fetched from, decompressed, compressed and stored again in the image data file. Since this cycle may happen every time the image data is processed, the quality of the image may get progressively worse each time an image is subjected to modifications.

The above discusses storing of the images in a lossy compression format. Another possibility is to store images by so called lossless compression formats. JPEG2000 is an example of a compression standard supporting both lossy and lossless compression. However, the lossless formats require more memory capacity for the image data storing than the lossy formats. Therefore the lossless formats may not be suitable for substantially small portable devices, such as for example digital cameras or display devices.

Digital imaging is gaining more popularity. An especially rapidly growing area of digital image handling is believed to be transportation of digital image data over data networks. At least the transmitting device or the receiving device may be a portable user equipment or other mobile station capable of communication over a wireless interface with the data network apparatus. As the size and/or weight is typically an important feature of the portable devices, the above discussed limitations in size and memory capacity need to be taken into consideration when designing such devices.

The end users of the image capturing or displaying devices may also wish to be more readily able to define the borderlines of an image. To enable this it is likely that even the user equipment will be provided with at least some level of borderline adjustment facility. The inventor believes also that at least in the first wireless image data transmission devices the image compression methods are likely to be based on lossy compression techniques. This is believed to be so because of the pixel count in the image and demands on storing capacity grow faster than technologies that may be used to increase the storage capacity. However, the deteriorating quality of the images may become a problem also with devices that are based on the lossless techniques.

SUMMARY OF THE INVENTION

Embodiments of the present invention aim to address one or several of the above problems.

According to one aspect of the present invention, there is provided a method of storing image data and displaying images based on the stored image data, comprising: dividing an image into a plurality of image data blocks; compressing each of the image data blocks separately; storing the compressed image blocks in a data storage means; selecting at least one of the image data blocks to be fetched from the data storage means; fetching said selected at least one image data block from the data storage means; decompressing said at least one fetched image data block; and displaying an image based on image data included in the decompressed at least one image data block.

According to another aspect of the present invention there is provided a display device for displaying images based on image data, wherein image data associated with an image has been divided into a plurality of image data blocks before being stored in a compressed format in an image data storage means, the display device comprising: selection means for selecting at least one of the image data blocks to be fetched from the image data storage means; fetching means for fetching said selected at least one image data block from the data storage means; decompressing means for decompressing said at least one fetched image data block; and display means for displaying an image based on image data included in the fetched at least one image data block.

The arrangement is preferably such that the changes in the image boundaries to be displayed do not affect the image data stored in the data unit.

The selection means may be adapted to adjust the boundary of the image to be displayed by selecting appropriate image data blocks. The selection means may be operated based on a preview.

Each of the image data blocks may be provided with an identifier.

The compressed image data blocks may be stored in an image data field of an image data storage unit and information associated with the selection of image data blocks is stored in another field of the image data storage unit.

The selected at least one block may be copied to a new image data file from the compressed image data blocks.

The image may be displayed on a display screen of a portable display device. The image data may be transmitted to the display device over a wireless interface.

The embodiments may enable edition and/or adjustment of image boundaries without any substantial reduction in the quality of the image data. The embodiments may provide an easy way to undo changes in the image area and return to the original image without losses in quality or information content. An image can be adjusted in several different ways without affecting the original image information. For example, the embodiments may enable storage of two different image areas and selection one of these based on the conditions or situations in which the image is displayed.

BRIEF DESCRIPTION OF DRAWINGS

For better understanding of the present invention, and ways to put the invention into effect, reference will now be made by way of example to the accompanying drawings in which:

FIG. 1 shows an image presentation means in which embodiments of the present invention may be utilised;

FIGS. 2a and 2b illustrate an embodiment of the invention;

FIG. 3 illustrates a further embodiment;

Figure 4:
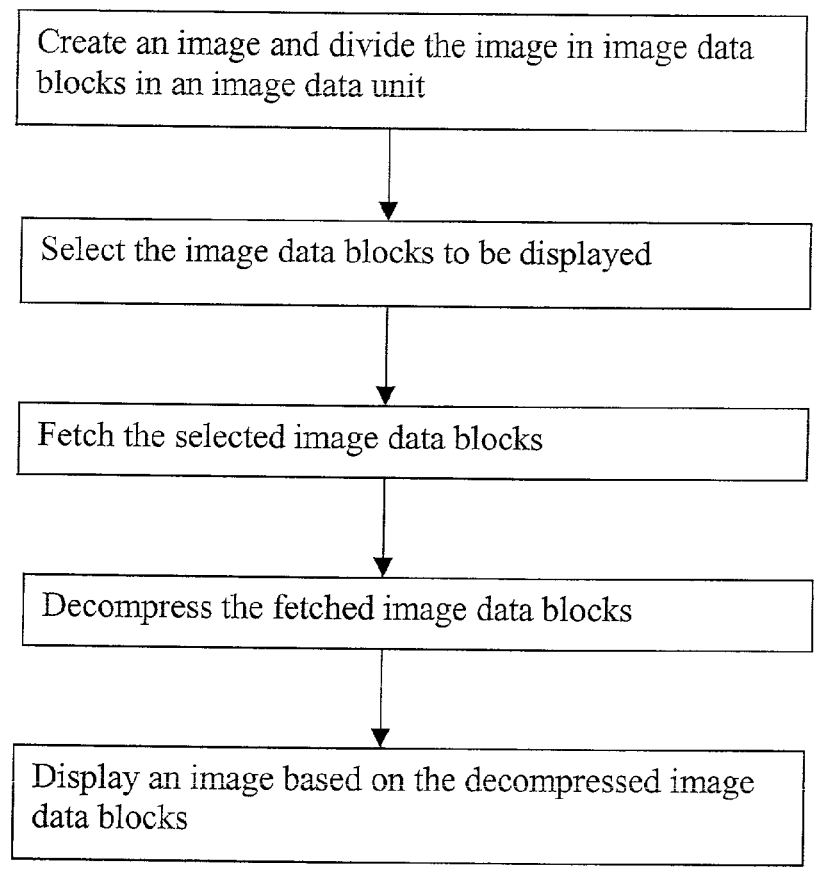
FIG. 4 is a flowchart illustrating the operation of an embodiment of the present invention.

DESCRIPTION OF PREFERRED
EMBODIMENTS OF THE INVENTION

Reference is made to FIG. 1 which shows a portable user equipment 1 comprising a display means 2. More particularly, the user equipment 1 comprises a mobile station capable of communication over a data communication network via a wireless interface between antenna means 7 and the network. Elements of the data communication network are not shown for clarity reasons.

The operation of the representation device 1 and/or the display screen 2 may be controlled by a control processor 5. The device 1 is also preferably provided with data storage means 4. An operational connection 6 is provided between the data storage means 4 and the control processor 5.

The display means 2 is adapted to present images based on image data. The image data may be stored in the storage 4. The image data may be processed by the processor 6 before displaying the image to the user. The processing may be accomplished based on a control software run on the processor.

The device 1 may comprise one or more control buttons 3. The control buttons may be used to control the operation of the device and also to edit the image before and during the display thereof.

The schematic exemplifying image displayed by the display screen 2 illustrates two boxes and a ball. The display means may comprise any appropriate display arrangement, such as a liquid crystal display (LCD). It shall be appreciated that the display means of FIG. 1 is only an example, and that the display means does not form an essential part of the invention. The display means may alternatively comprise e.g. a printer device producing a reprint of the image based on image data processed by the user device 1. Since various alternatives for the user devices and possible display means as such are well known by the skilled person, these will not be described in more detail herein.

The following will discuss in more detail exemplifying embodiments of the invention. In these examples a JPEG file format is used for storing and/or transporting image data. JPEG file format is a well known format in the art of storing images using lossy compression, and the principles thereof will thus not be explained in more detail.

The embodiments relate to prevention of quality losses when adjusting image boundaries, i.e. during the so called image cropping. The embodiment is described with reference to FIGS. 2a and 2b and the flowchart of FIG. 4.

The original image 30 has been divided into smaller image data blocks 31. The image data blocks 30 may be, for example, 8 pixel*8 pixel blocks. Lossy JPEG compression may be used for compressing each of the image data pixel blocks 31 one by one to compressed format. In the compressed format the blocks 31 are preferably stored in the same order as they are in the original image 30.

It is sometimes necessary to cut of the border areas of the image 30, i.e. to crop the image. For example, the user of the representation device may wish to adjust the boundaries of the image, e.g. so that the image fits the available display screen area of the display device. The cropped area of the image 30 of FIG. 2a is shown to comprise the six blocks 31 within the rectangular cropping window 32. The "cropped" image is shown in FIG. 2b.

The selection of the image data blocks that are to be displayed may be based on a preview of the image. The preview is a known feature of the display devices. During the preview the user of the device may select the image area he/she wishes to be displayed. The cropping is then accomplished accordingly in response to the selection. The cropping can be performed under the control of the processor 5 of the display device 1.

According to a possibility all image data blocks are decompressed before the preview. After the image area selection the decompressed data is simply deleted and the cropped image is based on those image data blocks that have fetched based on the selection.

The display device may be provided with a control software that is adapted to select the appropriate blocks. For example, during the preview the user points the image area he/she wishes to be displayed. The control software is aware of the division of the pixels into the blocks. Based on the information about the division it may suggest which blocks need to be selected in order to obtain an image that substantially corresponds the selected area. After the selection these blocks are fetched from the storage means and the selected image area is displayed on the display.

FIG. 3 illustrates an embodiment of the present invention. In here it is assumed that a 40×40 (=5*8×5*8) pixels image has been created. It is preferred to have an appropriate name for each of the blocks so that they may be identified later on. The identifier can be name a of the block or e.g. the location of the block in the image area.

In FIG. 3 alphabets from a to t have been designated to represent twenty 8×8 pixel blocks 31 in a JPEG image file. The twenty blocks (a to t) are in a compressed domain and thus the blocks cannot be displayed before decompression thereof. When cropping the image, it is possible to decide that only the center or other predefined area of the image is to be displayed. In FIG. 3 blocks 'ghilmn' of the image 30 are selected for the cropped image 32. This may be enough e.g. for displaying an image of a face.

The cropping may be done without affecting the original JPEG image data on the image data file. The modifications to the boundaries of the image area are made by means of the selective fetching without modifying the image data stored in the data storage means. Thus it is not necessary to perform the decompress and compress cycle for the original image data file to get the cropped image. Even if the entire image data file has been decompressed for the preview, it is not necessary to restore, but the decompressed preview data may be deleted. Thus it is possible to avoid quality losses that are caused by the decompression-compression cycle to the original image data.

The six blocks 'ghilmn' may be selected and copied to a new image file. The cropped image may then be displayed based on the new file. The pixel blocks 'ghilmn' may copied e.g. to a new JPEG file. The image data associated to image 32 of FIG. 2b may be stored after viewing for later use or it may deleted.

Figure 5A:
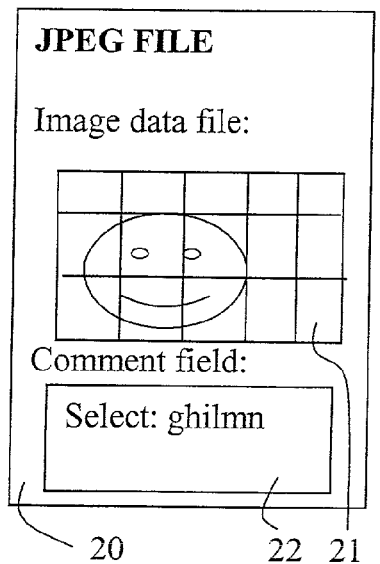
FIGS. 5a and 5b illustrate a further embodiment of the present invention.
Figure 5B:
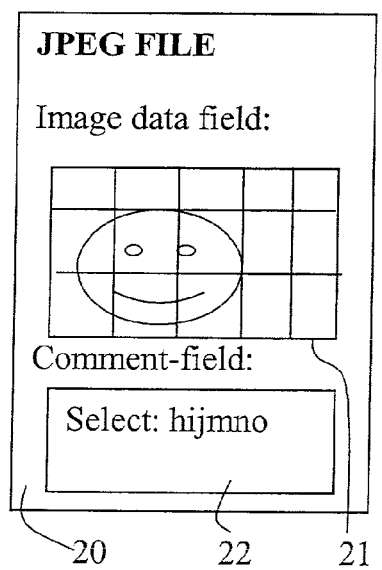

FIGS. 5a and 5b illustrate a further embodiment. In this embodiment the image data file 20 is provided with a data field 21 and a comment field 22. The comment field may be used for storing free form information that associates with the border line adjustments. The data associated with the changes in the image area can be stored beforehand to the JPEG file by storing this data in the comment field. By means of this it may be possible to avoid manual selection and/or preview operations.

More particularly, in FIG. 5a the comment field 22 comprises selection information that is associated with a certain type of display device (e.g. a certain display screen size or type). That is, the comment field indicates those blocks of image 31 of FIG. 3 that should be cropped when the image is to be displayed with a specific type of a device.

The comment field or other free format data field may also include initial settings for the cropping parameters that were set when the image data was first created as a basic setting to be used when displaying the image. These settings may always be used as a default.

It is also possible to store information in the comment field regarding parameters that are preferred by a user of a device. A user may also later on adjust the default or previous settings to fit better the actual use of an image. FIG. 5b shows the situation in which the parameters in field 22 have been changed from the parameters shown in FIG. 5a after the image data has been fetched and the viewer of the image has adjusted cropping parameters to suit better for his/hers use.

The above described usage of the comment field of a JPEG file. This does not does not prevent viewing an image based on image data stored in the JPEG file by means of programs and display applications which are not capable of understanding the information content in the comment field 22. The comment field 22 is a part of the JPEG standard, and the JPEG compatible devices are typically adapted to ignore any information in the comment field they cannot interpret and/or utilise. There is no limitations for the content that may be stored in said comment field. The way how the information associated with the cropping of the image is stored in the separate data field may be standardised, at least to some level, so that different software applications that write/read information in the separate data field may recognise the information associated with the amendments.

The decompression-compression cycle and/or decompression of all of the image data for the preview purposes can also be avoided by displaying only a rough or scaled version of the image at the preview stage. For example, a so called thumb nail version of the image may be provided in the image data unit for the preview purposes. Some formats may also allow decompression of only a portion of the image data in each block for the preview such that only a rough image is displayed to the viewer. The viewer may then select the image area he/she wants to view based on the main forms and/or features of the image that are made visible to him.

The embodiment of the present invention has been described in the context of a JPEG format. This invention is also applicable to any other compression and/or processing techniques. For example, it is possible to store image data in a JPEG 2000 file or any other data format which supports division of the image area into a plurality of blocks.

It shall be appreciated that whilst the FIG. 1 embodiment of the present invention was described in relation to a mobile station, embodiments of the present invention are applicable to any other suitable type of user equipment capable of presenting an image or audio presentation to the user thereof. These devices include, without limiting to these, digital cameras and recorders, various display devices provided with image editing facility and so on.

It is also noted herein that while the above describes exemplifying embodiments of the invention, there are several variations and modifications which may be made to the disclosed solution without departing from the scope of the present invention as defined in the appended claims.

The invention claimed is:

1. A method of storing image data and displaying images based on the stored image data, comprising:
   dividing an image into a plurality of image data blocks;
   compressing each of the image data blocks separately;
   storing the compressed image blocks in a data storage means;
   selecting at least one of the image data blocks to be fetched from the data storage means;
   fetching said selected at least one image data block from the data storage means;
   decompressing said at least one fetched image data block;
   adjusting the size of the image area of an image to be displayed by selecting at least one image data block; and
   displaying the image with adjusted image area based on image data included in the decompressed at least one selected image data block.

2. A method as claimed in claim 1, comprising storing the selected at least one image block in a new image file without a decompression-compression cycle.

3. A method as claimed in claim 1, wherein the initial compressed data remains substantially unchanged during the display procedures.

4. A method as claimed in claim 1, comprising the steps of displaying a preview of the stored image and selecting the image data blocks based on said preview.

5. A method as claimed in claim 1, wherein the image data is decompressed before the selection of at least one image data block to be fetched.

6. A method as claimed in claim 1, wherein the image data blocks are selected based on a suggestion by a selection software run on a controller of a display device.

7. A method as claimed in claim 1, wherein each of the image data blocks is provided with an identifier and the selection and fetching of the blocks is based on said block identifiers.

8. A method as claimed in claim 1, wherein the image data blocks are stored in the same order as they are positioned in the original image.

9. A method as claimed in claim 1, wherein said compressed image data blocks are stored in an image data field of an image data storage unit and information associated with the selection of image data blocks is stored in another field of the image data storage unit, wherein at least one block is selected based on said information.

10. A method as claimed in claim 9, wherein said other field comprises a comment field.

11. A method as claimed in claim 9, wherein the most recent information associated with the selection of the image data blocks is stored in the said other field.

12. A method as claimed in claim 1, wherein the selected at least one block is copied to a new image data file from the compressed image data blocks.

13. A method as claimed in claim 12, wherein the at least one block is stored in an image data field of the image data file.

14. A method as claimed in claim 1, wherein the image data is stored in a lossy format.

15. A method as claimed in claim 14, wherein the image data storage means comprises a JPEG file or similar.

16. A method as claimed in claim 1, wherein the image is displayed on a display screen of a portable display device.

17. A method as claimed in claim 16, wherein the image data is transmitted to the display device over a wireless interface.

18. A display device for displaying images based on image data, wherein image data associated with an image has been divided into a plurality of image data blocks before being stored in a compressed format in an image data storage means, the display device comprising:

selection means for selecting at least one of the image data blocks to be fetched from the image data storage means, wherein the selection means are adapted to adjust the boundary of the image to be displayed by means of selecting appropriate image data blocks;

fetching means for fetching said selected at least one image data block from the data storage means;

decompressing means for decompressing said at least one fetched image data block; and display means for displaying an image based on image data included in the fetched at least one image data block.

19. A display device as claimed in claim 18, adapted for storing at least one image block selected by the selection means in a new image file without a decompression-compression cycle.

20. A display device as claimed in claim 18 being arranged to display a preview of the stored image, wherein the selection means are operated based on said preview.

21. A display device as claimed in claim 18, wherein the selection means comprise a set of instructions adapted to produce a suggestion regarding the blocks to be selected.

22. A display device as claimed in claim 18, wherein each of the image data blocks is provided with an identifier and the selection and fetching of the blocks is based on said block identifiers.

23. A display device as claimed in claim 18, wherein said compressed image data blocks are stored in an image data field of an image data storage unit and information associated with the selection of image data blocks is stored in another field of the image data storage unit.

24. A display device as claimed in claim 18, wherein the image data is stored in a lossy format.

25. A display device as claimed in claim 18, wherein the arrangement is such that the changes in the image to be displayed do not affect the image data stored in the data unit.

26. A display device as claimed in claim 18, comprising a portable device.

27. A display device as claimed in claim 18, comprising a mobile station.

28. A display device as claimed in claim 18, comprising a digital camera.

* * * * *